United States Patent
Garner et al.

(10) Patent No.: US 7,447,049 B2
(45) Date of Patent: Nov. 4, 2008

(54) SINGLE ENDED FLYBACK POWER SUPPLY CONTROLLERS WITH INTEGRATOR TO INTEGRATE THE DIFFERENCE BETWEEN FEEDBACK SIGNAL A REFERENCE SIGNAL

(75) Inventors: David M. Garner, London (GB); David Robert Coulson, Comberton (GB); Devarahandi Indika Mahesh de Silva, Cambridge (GB); Jayaraman Kumar, Cambridge (GB); Vinod A. Lalithambika, Cambridge (GB)

(73) Assignee: Cambridge Semiconductor Limited, Cambridge Cambridgeshire (GB)

( * ) Notice: Subject to any disclaimer, the term of this patent is extended or adjusted under 35 U.S.C. 154(b) by 69 days.

(21) Appl. No.: 11/445,482

(22) Filed: Jun. 1, 2006

(65) Prior Publication Data
US 2007/0274107 A1    Nov. 29, 2007

(30) Foreign Application Priority Data
May 23, 2006    (GB) ................... 06102107

(51) Int. Cl.
H02M 3/335    (2006.01)
H02M 3/24    (2006.01)
H02M 7/44    (2006.01)
(52) U.S. Cl. ............... 363/21.12; 363/21.17; 363/97
(58) Field of Classification Search ............. 363/21.12, 363/21.16, 21.17, 95, 97, 131
See application file for complete search history.

(56) References Cited
U.S. PATENT DOCUMENTS
4,672,516 A    6/1987    Ney et al.
4,858,094 A    8/1989    Barlage (Continued)

FOREIGN PATENT DOCUMENTS
WO    WO-03/047079 A2    6/2003

(Continued)

OTHER PUBLICATIONS

UK Search Report dated Jul. 12, 2007 in corresponding GB Patent Application GB0610210.7, 1 pg.

(Continued)

*Primary Examiner*—Bao Q Vu
(74) *Attorney, Agent, or Firm*—Schwegman, Lundberg & Woessner P.A.

(57) ABSTRACT

This invention relates to SMPS controllers employing primary side sensing to detect a point of zero magnetic flux, at which the output voltage of the SMPS may be sampled accurately on the primary side. We describe a switch mode power supply (SMPS) controller for regulating the output voltage of an SMPS is response to a feedback signal from an auxilliary winding of a magnetic energy storage device forming part of an output circuit of the SMPS, the SMPS controller comprising: a reference level input to receive an output reference level signal; an input to receive said feedback signal, said feedback signal being responsive to a voltage on said auxilliary winding of said magnetic energy storage device; an integrator to integrate a difference between said feedback signal and a first fixed reference level signal; a first comparator to compare an output of said integrator with a second fixed reference level signal and to provide an output responsive to said comparison for regulating said SMPS output voltage.

21 Claims, 4 Drawing Sheets

U.S. PATENT DOCUMENTS

| | | |
|---|---|---|
| 5,940,281 A | 8/1999 | Wolf |
| 5,999,433 A * | 12/1999 | Hua et al. ............... 363/132 |
| 6,301,135 B1 | 10/2001 | Mammano et al. |
| 6,333,624 B1 | 12/2001 | Ball et al. |
| 6,373,726 B1 | 4/2002 | Russell |
| 6,385,059 B1 | 5/2002 | Telefus et al. |
| 6,707,283 B1 | 3/2004 | Ball |
| 6,721,192 B1 | 4/2004 | Yang et al. |
| 6,788,555 B2 * | 9/2004 | Bourdillon et al. ....... 363/21.14 |
| 6,836,415 B1 | 12/2004 | Yang et al. |
| 6,862,198 B2 | 3/2005 | Muegge et al. |
| 6,882,552 B2 | 4/2005 | Telefus et al. |
| 6,900,995 B2 | 5/2005 | Muegge et al. |
| 6,956,750 B1 | 10/2005 | Eason et al. |
| 6,958,920 B2 | 10/2005 | Mednik et al. |
| 6,972,969 B1 | 12/2005 | Shteynberg et al. |
| 6,977,824 B1 | 12/2005 | Yang et al. |
| 6,985,368 B2 | 1/2006 | Park |
| 7,016,204 B2 | 3/2006 | Yang et al. |
| 7,027,312 B2 | 4/2006 | Park |
| 7,057,907 B2 * | 6/2006 | Oh ....................... 363/21.05 |
| 7,061,780 B2 * | 6/2006 | Yang et al. ............ 363/21.16 |
| 7,259,972 B2 * | 8/2007 | Yang ...................... 363/21.16 |
| 2002/0015315 A1 | 2/2002 | Telefus |
| 2005/0024898 A1 | 2/2005 | Yang et al. |
| 2005/0073862 A1 | 4/2005 | Mednik et al. |
| 2005/0169017 A1 | 8/2005 | Muegge et al. |
| 2005/0276083 A1 | 12/2005 | Berghegger |
| 2005/0285587 A1 | 12/2005 | Yang et al. |
| 2006/0034102 A1 | 2/2006 | Yang et al. |
| 2006/0050539 A1 | 3/2006 | Yang et al. |
| 2006/0055433 A1 | 3/2006 | Yang et al. |
| 2006/0056204 A1 | 3/2006 | Yang et al. |

FOREIGN PATENT DOCUMENTS

| | | |
|---|---|---|
| WO | WO-2004/051834 A1 | 6/2004 |
| WO | WO-2004/082119 A2 | 9/2004 |
| WO | WO-2004/112226 A1 | 12/2004 |
| WO | WO-2004/112227 A1 | 12/2004 |
| WO | WO-2005/011095 A1 | 2/2005 |
| WO | WO-2005/048442 A1 | 5/2005 |

OTHER PUBLICATIONS

PCT Application No. PCT/GB2007/050260, Partial International Search Report, 1 pg.

* cited by examiner

SINGLE ENDED FLYBACK POWER SUPPLY CONTROLLERS WITH INTEGRATOR TO INTEGRATE THE DIFFERENCE BETWEEN FEEDBACK SIGNAL A REFERENCE SIGNAL

RELATED APPLICATION

This application claims priority under 35 U.S.C. 119 from United Kingdom Application No. 0610210.7 filed 23 May 2006, which application is incorporated herein by reference.

FIELD OF THE INVENTION

This invention generally relates to switch mode power supply (SMPS) controllers and to related methods, and more particularly to SMPS controllers employing primary side sensing to detect a point of zero magnetic flux, at which the output voltage of the SMPS may be sampled accurately on the primary side.

BACKGROUND TO THE INVENTION

Broadly speaking in a switch mode power supply a magnetic energy storage device such as a transformer or inductor is used to transfer power from an input side to an output side of the SMPS. A power switch switches power to the primary side of the energy storage device, during which period the current and magnetic field builds up linearly. When the switch is opened the magnetic field (and secondary side current) decreases substantially linearly as power is drawn by the load on the output side.

An SMPS may operate in either a discontinuous conduction mode (DCM) or in continuous conduction mode (CCM) or at the boundary of the two in a critical conduction mode. In this specification we are particularly concerned with DCM operating modes in which, when the switching device is turned off, the output voltage steadily, but gradually, declines until a point is reached on the knee of the output curve at which substantially zero output current flows an the inductor or transformer begins to ring, entering a so-called oscillatory phase. The period of the ringing is determined by the inductance and parasitic capacitance of the circuit. In this specification DCM includes so-called critical (discontinuous conduction) mode (CRM) operation in which the power switch is turned on again at the first trough of the oscillatory phase (sometimes referred to as the flyback oscillation). Operation in CRM can be particularly efficient by reducing losses associated with the power switch turn-off transition.

Often the output voltage of an SMPS is regulated by sensing circuitry on the output side, coupled back to the input side of the SMPS by means of an opto-isolator. However some improved techniques employ primary side sensing or, more generally, sensing employing an auxiliary winding on the magnetic energy storage device, or in some related circuits an auxiliary winding of an output filter inductor.

Some background prior art relating to primary side sensing can be found in U.S. Pat. No. 6,958,920; U.S. Pat. No. 6,721, 192; US2002/015315; WO 2005/048442; WO 2004/051834; US2005/0024898; US2005/0169017; U.S. Pat. No. 6,956, 750; U.S. Pat. No. 6,862,198; US 2006/0056204; U.S. Pat. No. 7,016,204; US 2006/0050539; US 2006/0055433; US 2006/0034102; U.S. Pat. No. 6,862,198; and U.S. Pat. No. 6,836,415. Still further background prior art can be found in U.S. Pat. No. 6,385,059, US20050276083, U.S. Pat. No. 6,977,824, U.S. Pat. No. 6,956,750, U.S. Pat. No. 6,900,995, WO2004082119, U.S. Pat. No. 6,972,969, WO03047079, U.S. Pat. No. 6,882,552, WO2004112227, US2005285587, WO2004112226, WO2005011095, U.S. Pat. No. 6,985,368, U.S. Pat. No. 7,027,312, U.S. Pat. No. 6,373,726, U.S. Pat. No. 4,672,516, U.S. Pat. No. 6,301,135, U.S. Pat. No. 6,707, 283, and U.S. Pat. No. 6,333,624.

Figure 1:
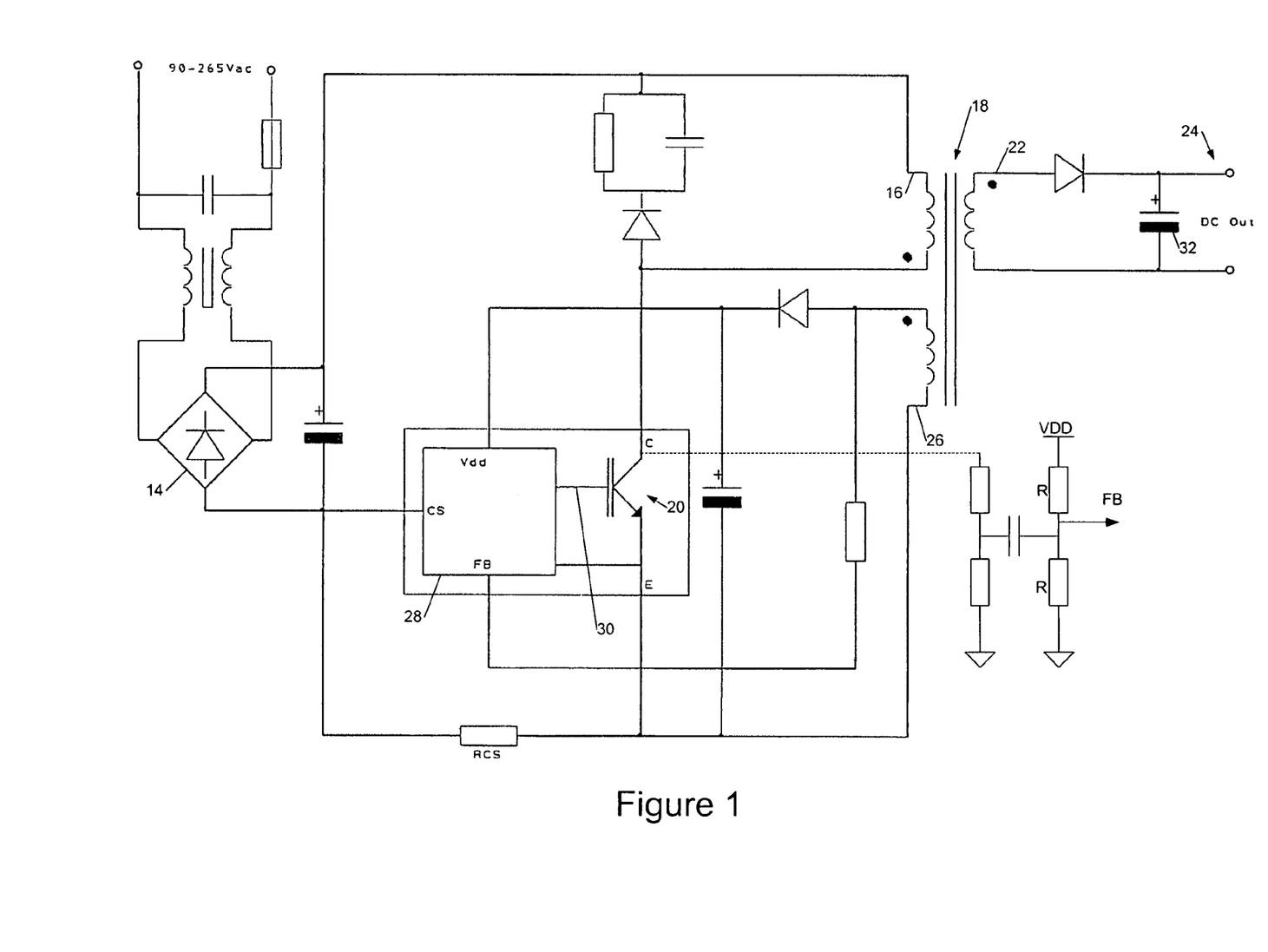
FIG. 1 shows an example of an SMPS incorporating primary side sensing.

Referring now to FIG. 1, this shows an example of a switch mode power supply circuit with primary side sensing. The power supply comprises an AC mains input coupled to a bridge rectifier 14 to provide a DC supply to the input side of the power supply. This DC supply is switched across a primary winding 16 of a transformer 18 by means of a power switch 20, in this example an insulated gate bipolar transistor (IGBT). A secondary winding 22 of transformer 18 provides an AC output voltage which is rectified to provide a DC output 24, and an auxiliary winding 26 provides a feedback signal voltage proportionally to the voltage on secondary winding 22. This feedback signal provides an input to a control system 28, powered by the rectified mains. The control system provides a drive output 30 to the power switching device 20, modulating pulse width and/or pulse frequency to regulate the transfer of power through transformer 18, and hence the voltage of DC output 24. In embodiments the power switch 20 and controller 28 may be combined on a single power integrated circuit.

As can be seen, the primary side controlled SMPS of FIG. 1 derives feedback information from the primary side of the transformer, using an auxiliary winding to avoid high voltage signals, the voltage being stepped down by the turns ratio of the transformer. As the skilled person will appreciate, however, it is not necessary to employ a separate auxiliary winding although this may be convenient if such a winding is already contemplated to provide a low voltage supply to the controller. For example, a voltage of the primary winding may be sensed, preferably capacitor coupled so that it can be referenced to the ground of the controller, and stepped down using a potential divider. An example circuit for this is shown inset in FIG. 1, with a dashed connection to the primary winding 16. The skilled person will further appreciate that an auxiliary winding is not necessary to provide a dc supply for the controller as this may be derived from the high voltage dc supply on the primary side of the SMPS or in a number of other ways, for example using a capacitor charge pump driven via a diode from the switched voltage on the power switch. In some preferred implementations, therefore, the auxiliary winding is omitted.

We will describe techniques for using the auxiliary voltage waveform to generate feedback information for regulating an SMPS. In embodiments this facilitates operation across a wide range of input and output conditions. In U.S. Pat. No. 6,958,920 a relatively complex arrangement is employed to sample a feedback voltage from an auxilliary winding at a time Tfb, which is deliberately offset from a time (To) of zero magnetisation current. It is desirable to improve upon this arrangement.

SUMMARY OF THE INVENTION

According to a first aspect of the invention there is therefore provided a switch mode power supply (SMPS) controller for regulating the output voltage of an SMPS is response to a feedback signal from a winding of a magnetic energy storage device forming part of an output circuit of the SMPS, the SMPS controller comprising: a reference level input to receive an output reference level signal; an input to receive said feedback signal, said feedback signal being responsive to a voltage on said magnetic energy storage device winding; an integrator to integrate a difference between said feedback signal and a first fixed reference level signal; a first comparator to compare an output of said integrator with a second fixed reference level signal and to provide an output responsive to said comparison for regulating said SMPS output voltage.

In an embodiment, the controller includes a second comparator to compare a signal derived from the feedback signal with a third reference level signal derived from the output voltage reference level signal, at a time when the first comparator indicates that the integrator output is substantially equal to said second fixed reference level signal. The controller may have an (internal) output coupled to an output of said second comparator to provide a regulation signal for controlling the SMPS to regulate the SMPS output voltage, for example by controlling the frequency and/or duration of pulses from a pulse generator driving a power switch of the SMPS.

In an embodiment, the second comparator includes a sample-hold circuit to sample and hold the output of the first comparator at the time when the first comparator indicates that the integrator output is substantially equal to the second fixed reference level signal. In some embodiments the first and second fixed reference level signals are essentially equal to one another, in embodiments both substantially equal to zero. More generally the first and second reference level signals are preferably configured such that the sample and hold time indicates a time when a magnetic flux in the energy storage device is exactly zero. The third reference level signal which is compared by the second comparator with the feedback signal or a scaled version thereof (more generally, the feedback signal waveform) may be equal to the output voltage reference level signal.

In embodiments the implementation can be simplified by using a drive signal for the switching device of the power supply to control the integrator to begin integrating, for example by re-setting the integrator, in particular when the switching device is switched on (power being provided to the magnetic energy storage device). This is particularly useful in operating modes where the flux in the magnetic energy storage device will generally have fallen to a relatively low level before the power switching device is once again activated for the next switching cycle.

As the skilled person will understand, in a discontinuous conduction mode the sensing signal waveform has a first, approximately linearly decaying portion during which power is supplied by said magnetic device to said SMPS output and a second, oscillatory or "resonant" portion during which substantially no power is supplied by the magnetic device to the SMPS output. These two portions of the feedback signal waveform meet at a "knee point".

In some further embodiments, rather than using a sample-hold circuit, the feedback signal (waveform) is integrated from a point of known, substantially zero flux found by the first integration (that is, the knee point in the feedback signal waveform), until a later point in time, for example a zero-crossing of the feedback signal waveform. This integration indirectly determines the amplitude of the feedback signal at the knee point, since the value of the integration depends upon this amplitude. For example, when integrating to the first zero-crossing point—in FIG. 3, from point A to half way between points A and B—the output of the integration is substantially equal to the area under a quarter of a cycle of a sine wave, which depends on (in embodiments, is equal to) the amplitude of this sine wave. In this way the reflected output voltage can be sensed indirectly, since this is proportional to the determined amplitude, the constant of proportionality depending on the turns ratio of the sensing winding to the secondary winding. In many embodiments the magnetic energy storage device comprises a transformer and the sensing winding comprises an auxiliary winding of the transformer, although a primary winding may alternatively be employed.

In a related aspect the invention provides a method of regulating the output voltage of an SMPS in response to a feedback signal from a winding of a magnetic energy storage device forming part of an output circuit of the SMPS, the method comprising: receiving an output reference level signal; receiving a feedback signal, said feedback signal being responsive to a voltage on said magnetic energy storage device winding; integrating a difference between said feedback signal and a first fixed reference level signal; comparing an output of said integration with a second fixed reference level signal and providing an output responsive to said comparison; and regulating the SMPS using the output of the comparing.

In an embodiment, the method further comprises comparing a signal derived from the feedback signal with a third reference level signal derived from the output voltage reference level signal at a time when the comparing of the integration output and the second fixed reference level signal indicates that the integrator output is substantially equal to the second fixed reference level signal; and regulating the SMPS output voltage responsive to the comparing of the signals derived from the feedback signal and the third reference level signal. Alternatively, as previously mentioned, the feedback signal waveform may be integrated, beginning at a time determined by the output of the second fixed reference level signal comparing (for example by resetting the integrator at this point), to determine a control signal for regulating the SMPS.

In some embodiments the comparing of the output of the integrator is performed at a time when the magnetic flux in the magnetic energy storage device is exactly zero. In embodiments, as described above, the signal difference integration may be controlled by the drive signal, in particular beginning when primary side power is supplied to the magnetic energy storage device.

In a further aspect the invention provides a method of regulating the output of an SMPS operating in a discontinuous conduction mode, the SMPS including a magnetic energy storage device having at least one winding, the method comprising: integrating a feedback signal from said at least one winding of said SMPS from a first point in time of known, substantially zero magnetic flux in the said magnetic energy storage device to determine a second time at which said magnetic flux is again substantially zero; and determining an error signal by integrating a waveform of said feedback signal from said second time to a third later time; and using said error signal to regulate said SMPS.

The invention still further provides an SMPS controller for regulating the output of an SMPS operating in a discontinuous conduction mode, the SMPS including a magnetic energy storage device having at least one winding, the system comprising: a first integrator to integrate a feedback signal from said at least one winding of said SMPS from a first point in time of known, substantially zero magnetic flux in the said magnetic energy storage device to determine a second time at which said magnetic flux is again substantially zero; and a second integrator to integrate a waveform of said feedback signal from said second time to a third later time and to output an error signal for controlling said SMPS.

In embodiments the error signal comprises an analogue error signal, as this facilitates stabilising the control loop of the SMPS. Alternatively the integration may integrate a difference between the sensing signal (waveform) and an expected value for the integration (such as the amplitude of the sensing signal at the knee point), for example in order to generate a digital signal representing whether the output voltage of the SMPS is above or below a target value.

The skilled person will appreciate that the above-described techniques may be employed in a wide variety of SMPS architectures including, but not limited to, a flyback converter and a direct-coupled boost converter. In some implementations the magnetic energy storage device comprises a transformer with primary, secondary, and auxiliary windings but in other implementations an auxiliary winding may be provided on another inductor of the SMPS. In still other implementations an auxiliary winding may be omitted and the sensing signal derived from a primary winding, for example as described above with reference to FIG. 1.

In a further related aspect the invention provides a switch mode power supply including an SMPS controller as described above.

In some embodiments an SMPS controller as described above is implemented mainly or entirely using analogue circuitry, in particular for the integration, differentiation, and comparison operations. However in other embodiments the SMPS controller may be implemented partially or wholly using digital circuitry. Thus the invention further provides a carrier medium carrying processor control code such as rtl or SystemC defining hardware to implements such circuitry.

BRIEF DESCRIPTION OF THE DRAWINGS

These and other aspects of the invention will now be further described, by way of example only, with reference to the accompanying figures in which.

DETAILED DESCRIPTION OF PREFERRED EMBODIMENTS

Broadly speaking we will describe a method of integrating the voltage on a primary or auxiliary winding of a magnetic energy storage device such as a transformer, in order to determine an optimum point of sampling the primary or auxiliary winding voltage to infer an output voltage of the SMPS. Thus embodiments of the technique integrate the sensed voltage from a point of known zero transformer flux to accurately determine a next point of zero transformer flux. This corresponds to an ideal time at which to sample the voltage on the primary or auxiliary winding in order to obtain an accurate measure of the SMPS output voltage. The known point of zero transformer flux is preferably determined using a peak detector to find the peaks and troughs of the auxilliary winding voltage waveform. A differentiator may be employed to find the peaks and troughs of this voltage waveform. The controller then, in embodiments, produces an analogue, that is non-quantised, error signal for regulating the output of a primary-side sensing SMPS system. The use of an analogue error signal allows the loop gain to be predicted accurately, allowing easier loop compensation. Moreover embodiments do not require a clocked digital system and may thus be free of clock quantisation errors. Further embodiments of the technique allow the supply current for the controller to be small.

One difficulty in primary-side sensing is deciding exactly when to sample the reflected secondary voltage. Ideally this voltage should be sampled at the point at which the current in the secondary winding just falls to zero, as it is at this point that the sampled voltage most accurately represents the output voltage. We will describe embodiments of an SMPS controller in which, as mentioned above, the voltage across the primary or auxilliary winding is integrated from a point of known, approximately zero flux (and hence current) in the transformer immediately prior to switching on the main power switching device on the primary-side of the SMPS. At the point at which the integrated signal is again equal to zero corresponds to the next point at which the flux (and hence secondary current) in the transformer is zero, and hence signals the correct point at which to sample the voltage on the primary or auxiliary winding to get an accurate indication of the output voltage. Embodiments of the SMPS controller we describe can be implemented more simply than controllers described in the prior art and, in embodiments provide more accurate output control by sensing exactly at a point of zero transformer flux.

Figure 2:
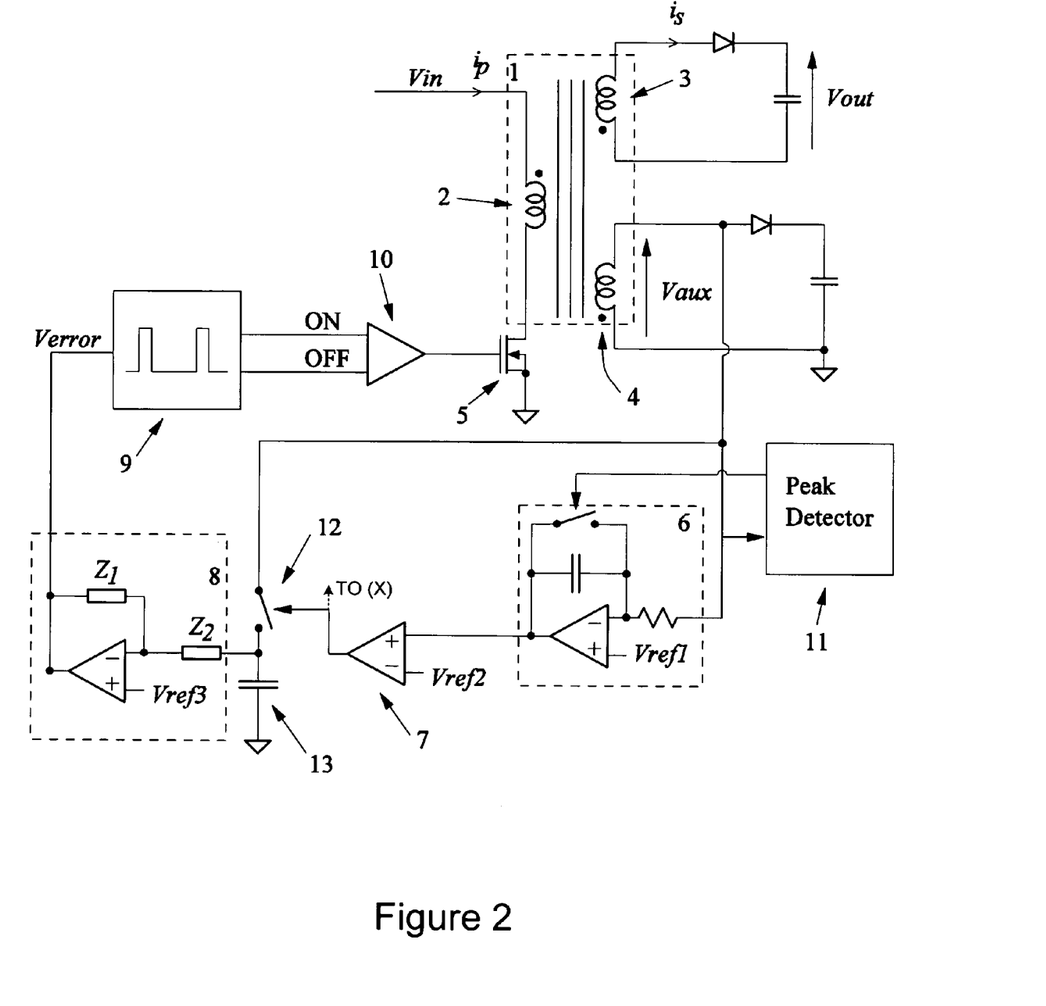
FIG. 2 shows a switch mode power supply (SMPS) including an SMPS controller according to an embodiment of the invention.

Referring now to FIG. 2, this shows a circuit diagram of an implementation of an embodiment of an SMPS controller according to the invention. As illustrated the controller is operating in the context of a flyback SMPS converter, but the skilled person will understand that the techniques we describe are also applicable to other forms of SMPS converters.

The flyback converter shown in FIG. 2 comprises a flyback transformer (1) having a primary winding (2), a secondary winding (3) and an auxilliary winding (4). The secondary winding is connected to a rectifier and smoothing capacitor to provide the output voltage; the auxilliary winding is similarly connected to a rectifier and smoothing capacitor and is used to provide the power to the control circuitry. The secondary winding is usually physically isolated from the primary and auxilliary windings and their associated components to meet legislative requirements.

The secondary voltage may be sensed with a voltage reference and error amplifier on the secondary side with the error signal being sent to the primary side using an isolating optocoupler device. However all these components are expensive and take space, and it is advantageous to be able to sense the secondary voltage by monitoring the waveform on the auxilliary winding, 'primary-side sensing' (PSS).

We describe a technique of PSS which does not rely on a clocked digital signal and which furthermore gives a true analogue error signal which can be amplified with a known gain such that the loop gain is finite and known, making compensation possible and making stable operation a possibility.

Figure 3:
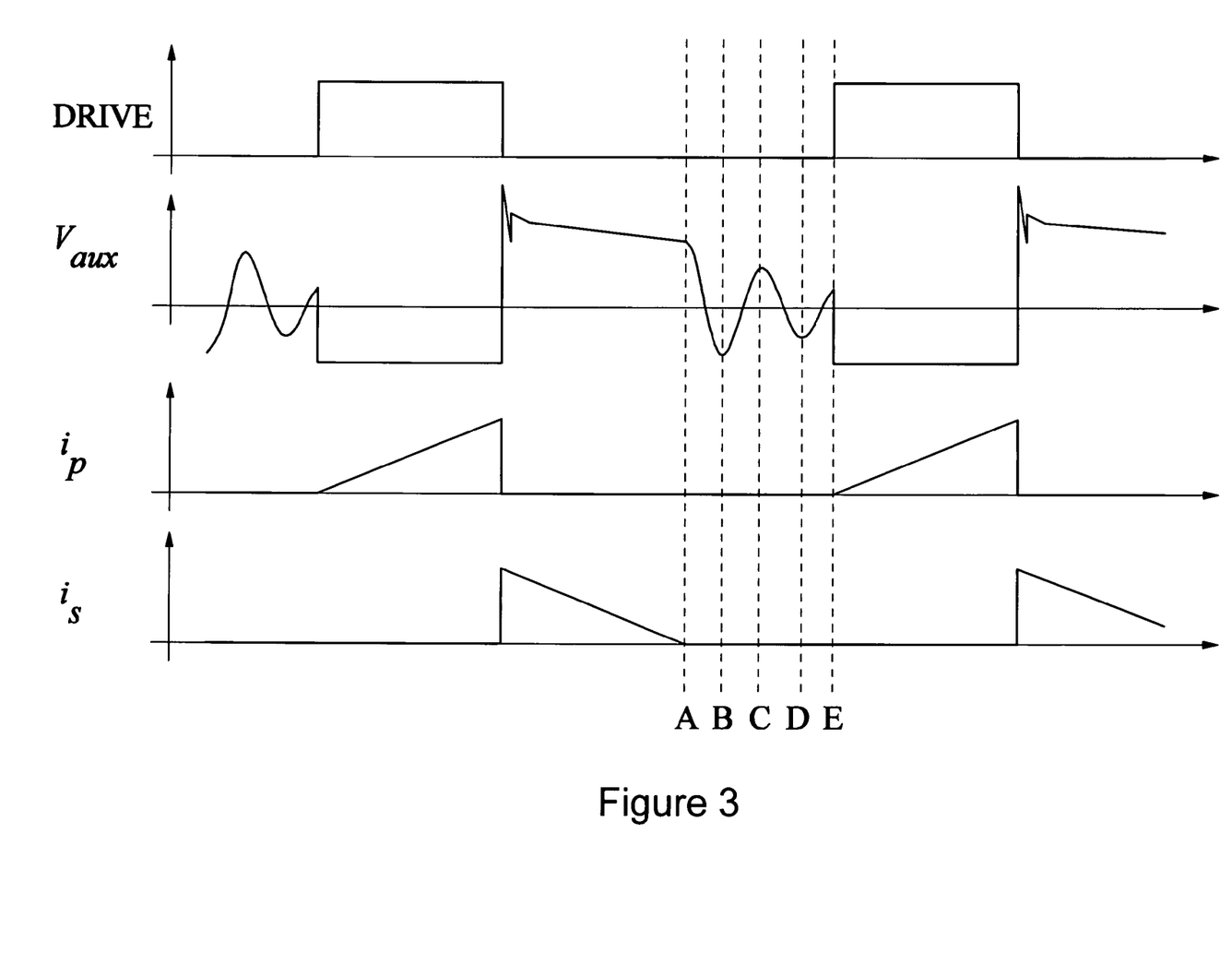
FIG. 3 shows waveforms illustrating the operation of the SMPS of FIG. 2.

Referring to FIG. 3, the ideal point at which to sample the waveform on the auxilliary winding ($V_{aux}$) is the point at which the current in the secondary winding ($I_s$) has just dropped to zero. This is time 'A' in the waveforms shown in FIG. 3. The reason for this is that, when the secondary current has just dropped to zero, there is no voltage drop across the secondary rectifier diode or its and the transformer's series resistance; thus, the voltage across the secondary winding is exactly equal to the output voltage. Because the voltage across the auxilliary winding is equal to the voltage across the secondary winding multiplied by the (known) turns ratio between the two windings, the secondary voltage can thus be inferred by measuring the voltage across the auxilliary winding at this point.

The voltage across an inductor is related to the current through it by the equation:

$$v = L\frac{di}{dt}$$

and therefore:

$$i = \frac{1}{L}\int v\, dt + C$$

where C is an unknown constant of integration and in this case represents the current (or flux) in the transformer at the beginning of the integration. Thus, if the voltage across the auxilliary winding is integrated from a point of known zero flux in the transformer (and hence current in any of the three windings of the transformer), then the point at which that voltage is again equal to zero indicates the next point of zero flux in the transformer.

To be more specific, and referring again to the waveforms in FIG. 3, as already stated the ideal sampling point on the auxilliary winding voltage waveform is at time point A. To work out where this point is, we integrate $V_{aux}$ and compare against a fixed reference. This is done using the integrator (6) in FIG. 3. Note that this shows a possible implementation of an integrator but that other implementations, such as switched-capacitor implementations, may also be employed.

Points of known zero transformer flux correspond to peaks and troughs on the auxilliary winding waveform (time points B, C, and D in FIG. 2), hence, to ensure that the auxilliary winding waveforms is integrated from a point of known zero flux, the integrator is reset at each of these peaks and troughs. The peaks and troughs are detected using a peak detector (11) which may take the form of a differentiator circuit or a diode-capacitor circuit (well know to those skilled in the art). Thus the integrator is always reset at a point of known zero flux immediately before the DRIVE signal goes high, and hence the switching cycle, begins. Note that the peak detector should ignore peaks and troughs when the DRIVE signal is high, and during the flyback pulse immediately following the DRIVE signal: this can be achieved using simple combinational logic.

The output of the integrator goes into a comparator which compares the integrator output to $V_{ref2}$. In a dual-supply system, $V_{ref1}=V_{ref2}=0$ V, however, in a single-supply system normally $V_{ref1}=V_{ref2}$ such that the comparator detects the point at which the integrator output voltage has returned to its output voltage at the time at which it was reset. However, in embodiments it may be advantageous to make these two reference voltages unequal to correct for errors in the circuit.

The output of the comparator hence goes high at the optimum time for sampling the auxilliary winding waveform, and this sampling is achieved by a simple a sample-and-hold circuit formed by the switch (12) and capacitor (13). Preferably the switch implemented by a transistor; however, a number of alternative sample-and-hold topologies may also be employed. The output of the sample-and-hold circuit is thus proportional to the SMPS output voltage, and this is compared to the desired output voltage ($V_{ref3}$) by an error amplifier 8. Loop compensation may be achieved by choosing suitable values for the impedances $Z_1$ and $Z_2$, in a manner well understood by those skilled in the art of SMPS design.

The error signal $V_{error}$ is used to drive a pulse generator (9) which varies the duty cycle of switching transistor (5) by adjusting the timing of the ON and OFF pulses outputted to gate driver (10).

Figure 4:
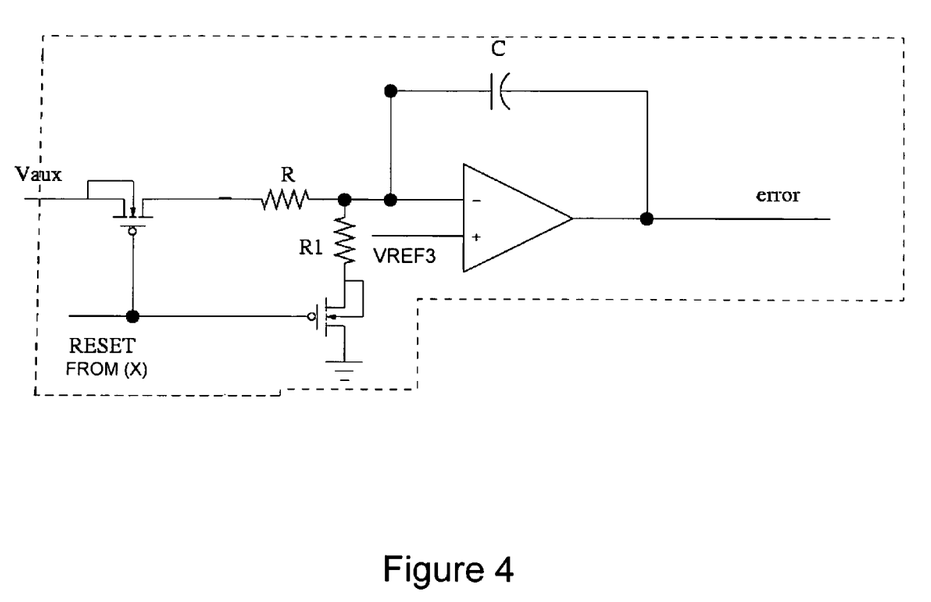
FIG. 4 shows an integrator which may be employed in embodiments of the invention.

FIG. 4 shows an integrator which may be employed in "area correlation" based embodiments of the invention. The integrator is reset by the output of comparator 7 of FIG. 2 so that it begins integrating at the knee of the Vaux curve (point A in FIG. 3). The output of the integrator may be sampled at the zero-crossing between points A and B in FIG. 3, to provide an error signal proportional to the difference between the actual SMPS output voltage and a target. The input to the integrator is (optionally) scaled by a potential divider comprising a pair of resistors R, R1 chosen such that when Vaux defines a quarter cycle of a sine wave the integral of the difference between scaled Vaux and VREF3 is zero. A comparator may be configured to compare Vaux with zero to determine the zero-crossing times.

Although in the technique described above the integrator 6 is reset at points of known zero flux at the peaks and troughs of the auxilliary winding voltage waveform, the accuracy of the auxilliary waveform sampling point may be sufficient if the integrator is simply reset at the start of the DRIVE pulse (time point E in FIG. 2), especially if the duty cycle is small or the transformer has a high damping factor such that the flux remaining the transformer is close to zero at this point. This may be implemented by using the ON signal which is outputted by pulse generator (9) to reset the integrator. The techniques we have described provide a stable and accurate way of detecting the feedback error of a primary side sensing SMPS, with a only a small number of components in the feedback loop. No doubt many other effective alternatives will occur to the skilled person. It will be understood that the invention is not limited to the described embodiments and encompasses modifications apparent to those skilled in the art lying within the spirit and scope of the claims appended hereto.

All documents, patents, and other references listed above are hereby incorporated by reference for any purpose.

We claim:

1. A switch mode power supply (SMPS) controller for regulating the output voltage of an SMPS in response to a feedback signal from a winding of a magnetic energy storage device forming part of an output circuit of the SMPS, the SMPS controller comprising:

a reference level input to receive an output reference level signal;

an input to receive said feedback signal, said feedback signal being responsive to a voltage on said winding of said magnetic energy storage device;

an integrator to integrate a difference between said feedback signal and a first fixed reference level signal;

a first comparator to compare an output of said integrator with a second fixed reference level signal and to provide an output responsive to said comparison for regulating said SMPS output voltage;

a second comparator to compare a signal derived from said feedback signal with a third reference level signal derived from said output reference level signal, at a time when said first comparator indicates that said integrator output is substantially equal to said second fixed reference level signal; and a controller output coupled to an output of said second comparator to provide a regulation signal for controlling said SMPS to regulate said SMPS output voltage.

2. An SMPS controller as claimed in claim 1 wherein said second comparator includes a sample-hold circuit to sample and hold the output of said first comparator at said time when said first comparator indicates that said integrator output is substantially equal to said second fixed reference level signal.

3. An SMPS controller as claimed in claim 2 wherein said first and second fixed reference level signals are configured such that said sample and hold time indicates that a magnetic flux in said energy storage device is exactly zero.

4. A switch mode power supply (SMPS) controller for regulating the output voltage of an SMPS in response to a feedback signal from a winding of a magnetic energy storage device forming part of an output circuit of the SMPS, the SMPS controller comprising:
   a reference level input to receive an output reference level signal;
   an input to receive said feedback signal, said feedback signal being responsive to a voltage on said winding of said magnetic energy storage device;
   an integrator to integrate a difference between said feedback signal and a first fixed reference level signal;
   a first comparator to compare an output of said integrator with a second fixed reference level signal and to provide an output responsive to said comparison for regulating said SMPS output voltage; and
   a second integrator, responsive to said output from said first comparator to begin integrating a waveform of said feedback signal, and having an output to provide a signal responsive to a value of said feedback signal at a point of approximately zero flux in said magnetic energy storage device.

5. An SMPS controller as claimed in claim 4 further comprising a zero-crossing detector to detect a zero crossing of said feedback signal and to stop said second integrator integrating responsive to a zero-crossing of said feedback signal.

6. An SMPS controller as claimed in claim 1 wherein said first and second reference level signals are substantially equal to one another.

7. An SMPS controller as claimed in claim 6 wherein said first and second reference level signals are substantially equal to zero.

8. An SMPS controller as claimed in claim 1 wherein said integrator is configured to begin integrating responsive to a switching control drive signal, said drive signal controlling a switching device of said SMPS switching power to said magnetic energy storage device to transfer energy between an input and an output of said SMPS.

9. An SMPS controller as claimed in claim 8 wherein said integrator is configured to be reset responsive to said drive signal indicating that said switching device has switched on power to said magnetic energy storage device.

10. An SMPS controller as claimed in any claim 1 said magnetic energy storage device comprises a transformer, and wherein said winding comprises an auxilliary winding of said transformer.

11. A switch mode power supply (SMPS) comprising the SMPS controller of claim 1.

12. A method of regulating the output voltage of an SMPS in response to a feedback signal from a winding of a magnetic energy storage device forming part of an output circuit of the SMPS, the method comprising:
   receiving an output reference level signal;
   receiving a feedback signal, said feedback signal being responsive to a voltage on said magnetic energy storage device winding;
   integrating a difference between said feedback signal and a first fixed reference level signal;
   comparing an output of said integration with a second fixed reference level signal and providing an output responsive to said comparison;
   regulating said SMPS using said output of said comparing;
   comparing a signal derived from said feedback signal with a third reference level signal derived from said output reference level signal at a time when said comparing of said integration output and said second fixed reference level signal indicates that said integrator output is substantially equal to said second fixed reference level signal; and
   regulating said SMPS output voltage responsive to said comparing of said signals derived from said feedback signal and said third reference level signal.

13. A method as claimed in claim 12 wherein said time of comparing comprises a time when a magnetic flux in said energy storage device is exactly zero.

14. A method of regulating the output voltage of an SMPS in response to a feedback signal from a winding of a magnetic energy storage device forming part of an output circuit of the SMPS, the method comprising:
   receiving an output reference level signal;
   receiving a feedback signal, said feedback signal being responsive to a voltage on said magnetic energy storage device winding;
   integrating a difference between said feedback signal and a first fixed reference level signal;
   comparing an output of said integration with a second fixed reference level signal and providing an output responsive to said comparison;
   regulating said SMPS using said output of said comparing;
   integrating a waveform of said feedback signal beginning at a time determined by said output of said comparing; and
   regulating said SMPS using an output of said waveform integrating.

15. A method of regulating the output voltage of an SMPS in response to a feedback signal from a winding of a magnetic energy storage device forming part of an output circuit of the SMPS, the method comprising:
   receiving an output reference level signal;
   receiving a feedback signal, said feedback signal being responsive to a voltage on said magnetic energy storage device winding;
   integrating a difference between said feedback signal and a first fixed reference level signal; wherein said integrating comprises integrating beginning at a time when a switching device controlling switching of power to said magnetic energy storage device switches on;
   comparing an output of said integration with a second fixed reference level signal and providing an output responsive to said comparison; and
   regulating said SMPS using said output of said comparing.

16. A method of regulating the output of an SMPS operating in a discontinuous conduction mode, the SMPS including a magnetic energy storage device having at least one winding, the method comprising:
   integrating a feedback signal from said at least one winding of said SMPS from a first point in time of known, substantially zero magnetic flux in said magnetic energy storage device to determine a second time at which said magnetic flux is again substantially zero; and
   determining an error signal by integrating a waveform of said feedback signal from said second time to a third later time; and
   using said error signal to regulate said SMPS.

17. A method as claimed in claim 16 further comprising identifying a zero-crossing of said feedback signal waveform to determine said third time.

18. A method as claimed in claim 16 further comprising identifying a peak or trough in said feedback signal waveform to determine said first point in time.

19. An SMPS controller for regulating the output of an SMPS operating in a discontinuous conduction mode, the SMPS including a magnetic energy storage device having at least one winding, the SMPS controller comprising:
- a first integrator to integrate a feedback signal from said at least one winding of said SMPS from a first point in time of known, substantially zero magnetic flux in said magnetic energy storage device to determine a second time at which said magnetic flux is again substantially zero; and
- a second integrator to integrate a waveform of said feedback signal from said second time to a third later time and to output an error signal for controlling said SMPS.

20. An SMPS controller as claimed in any claim 4, wherein said first and second reference level signals are substantially equal to one another.

21. An SMPS controller as claimed in claim 4, said magnetic energy storage device comprises a transformer, and wherein said winding comprises an auxilliary winding of said transformer.

* * * * *